Dec. 30, 1924.
R. A. MOORE
CAKE TURNER
Filed July 2, 1924
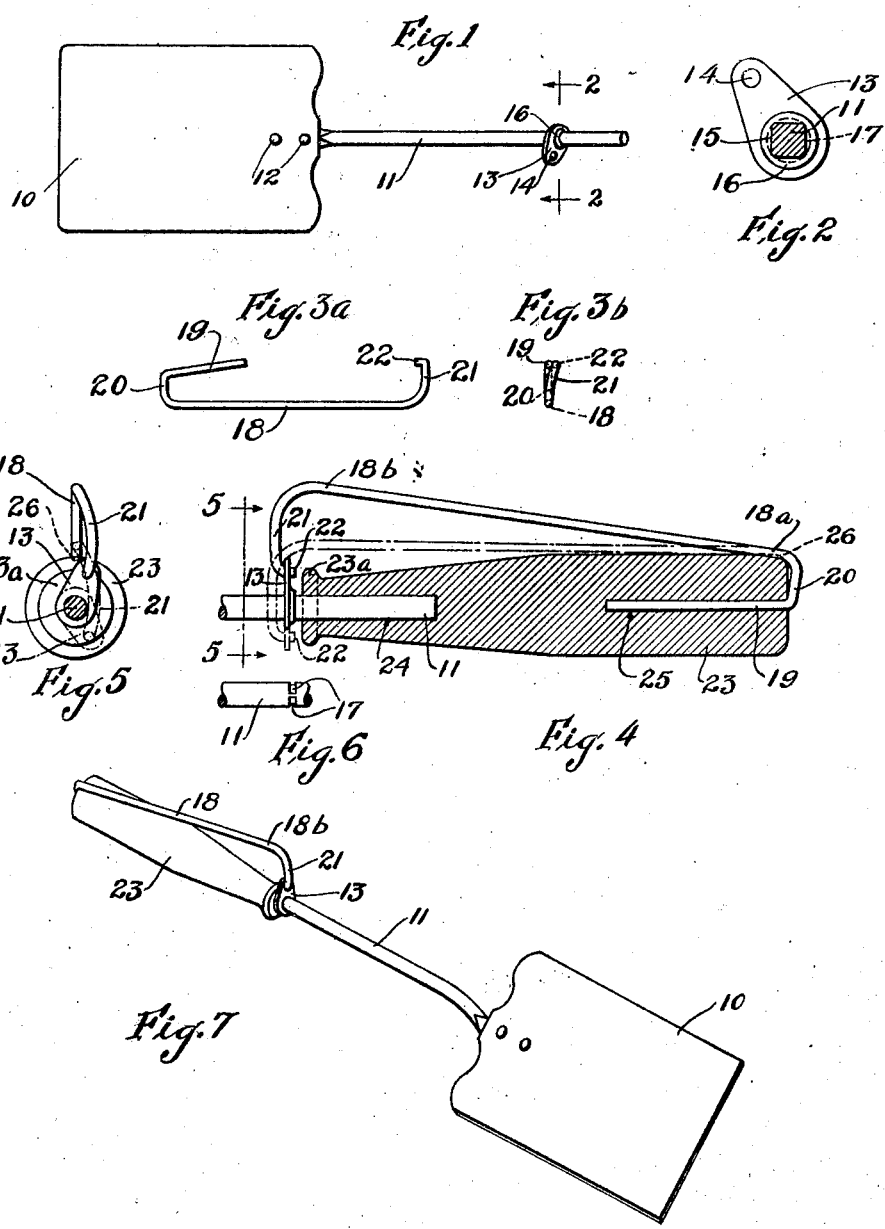

Patented Dec. 30, 1924.

1,520,959

UNITED STATES PATENT OFFICE.

ROBERT A. MOORE, OF NEW YORK, N. Y., ASSIGNOR TO RAM METAL PRODUCTS CO., INC., OF NEW YORK, N. Y., A CORPORATION OF NEW YORK.

CAKE TURNER.

Application filed July 2, 1924. Serial No. 723,702.

*To all whom it may concern:*

Be it known that I, ROBERT A. MOORE, a citizen of the United States, residing at New York, borough of Manhattan, in the county of New York and State of New York, have invented certain new and useful Improvements in Cake Turners, of which the following is a specification.

This invention relates to cake turners, and more particularly to a device comprising manually operated mechanism for rotating the blade of the cake turner.

Among the objects of this invention is to provide a cake turner which will save time and labor by eliminating the necessity for twisting the hand supporting the cake turner in order to turn the cake, said cake turner including a device operative by said hand to quickly and reliably rotate the blade supporting the cake for the purpose aforesaid.

Another object of this invention is to provide a cake turner having a handle adapted to be grasped by the hand of the operator, a blade and stem rotatable relatively thereto, and simple crank and spring means cooperating with said handle and said stem and operative by the hand aforesaid to rotate the blade, the rotation being effected in one direction by the hand and the spring returning the blade to normal position after release of the hand.

Still another object of this invention is to provide a novel and inexpensive method of attaching the aforesaid crank to the stem of the cake turner.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a top view showing the assembly of the blade, the stem and the crank.

Fig. 2 is the enlarged view of a section taken along the line 2—2 of Fig. 1.

Fig. 3ª is a side view of the spring.

Fig. 3ᵇ is an end view of the spring.

Fig. 4 is an enlarged longitudinal section showing my cake turning mechanism per se, and the extreme operating position thereof in dot and dash lines.

Fig. 5 is a transverse section on the line 5—5 of Fig. 4.

Fig. 6 is a view of a portion of the stem showing my novel method of providing for the attachment of the crank thereto.

Fig. 7 is a perspective view of my cake turner.

Referring now more specifically to the drawings, 10 represents a blade made of non-corroding metal and of the usual flat construction and attached to the flattened end of the round rod or stem 11 by means of the rivets 12, the portion of the stem adjacent to the blade being offset at an angle to the plane of the blade in the usual manner as shown in Fig. 7. The crank 13 is attached in spaced relation to the free end of the stem 11 and perpendicularly to the axis thereof. It is formed of sheet metal and has the holes 14 and 15 punched or otherwise formed therethrough, the latter hole being provided with an upraised peripheral bead or lip 16 adapted to be forced or pressed into the notches 17 formed peripherally in the stem so as to secure said crank non-rotatably thereon. The crank is now secured in rigid upstanding position relatively to the blade, and makes an angle with the plane perpendicular thereto, so that the hole 14 of the crank is always offset beyond the dead center as defined by the aforesaid plane.

A spring 18 is made of wire or other suitable material and comprises the center hook or guide arm 19 which is of suitable predetermined length and is formed at an angle with the free portion of the spring. The arm or tension member 20, which joins the center hook 19 with the spring 18, the former by a substantially sharp bend and the latter by an arcuate portion, is of a length predetermined for a purpose to be shown hereinafter. The arm 21 bearing the inwardly turned crank hook 22 substantially at right angles thereto, is of arcuate form as shown in Fig. 3ᵇ, so that the hook 22 is offset from the plane of the members 18, 19, and 20, a distance equal substantially to the offset distance of the hole 14.

A handle 23 of the usual conventional round type has drilled or otherwise formed therein the axial holes 24 and 25. The former, which is in effect a bearing, is adapted to rotatably receive the free end of the stem and is of such depth as to retain the crank 13 in spaced relation to the adjacent end 23ª of the handle. The hole 25 is formed preferably of somewhat smaller diameter than the center hook or guide 19 so as to rigidly hold the same when it is hammered or otherwise forced thereinto. Since the length of the arm 20 is less than the radius of the handle, the adjacent end 18ª of the spring bites into and forms a groove or notch 26 in the handle because of the tension exerted by said arm. The notch 18ª serves to prevent the spring from rotating about the handle when flexed as soon to be described. The free end of the stem is now inserted into the bearing 24 and the arm 21 sprung so as to permit the hook 22 to snap into the hole 14 of the crank. Since the hole 14 and the hook 22 are offset equal distances from the plane which is central to the cake turner and perpendicular to the blade thereof as aforesaid, the members 18, 19, and 20 will lie disposed in and determine said central plane and in axial symmetrical position to the handle of the cake turner.

It will be noted that my spring serves a number of important purposes, among which are that of an actuator to provide a convenient and efficient operation of the cake turner blade, and, secondly, as a means for retaining the stem in engagement with the handle. In connection with the latter purpose, it will be observed that I have formed the actuator to comprise two hooks directed toward each other, so that while one of them is secured to the handle, the other engages the stem crank, thus serving to hold the free end portion of said stem within the bearing of the handle. The actuator thus serves a number of functions that could ordinarily be accomplished only by various auxiliary devices, and the utility and practicability of my cake turner from a commercial standpoint is therefore greatly increased.

To operate my device, pressure is exerted upon the portion 18ᵇ of the spring, preferably by means of the thumb of the hand grasping the handle. This causes a clockwise rotation of the crank as in Fig. 5, the spring being depressed until the arm 21 strikes the stem 11 as shown in dot and dash lines, whereby the limit of motion is reached. A release of the spring permits the same to return the crank to normal position. The spring is of sufficient stiffness to prevent any possibility of the crank reaching dead center, and yet sufficiently elastic to permit of an instantaneous operation by the thumb as aforesaid. My device thus eliminates the disadvantages incident to the turning of a cake in the usual manner by the twisting of the operator's wrist by the substitution for that motion of a mere pressing with the thumb, whereby the stem is caused to rotate within the handle of the cake turner. A cake turner of this character will lend itself not only to a large variety of uses by the busy housekeeper but will be particularly serviceable in restaurants and other like establishments.

I claim:

1. In a cake turner, the combination with a handle having an axial bearing at the forward end thereof, a stem rotatable relatively thereto within said bearing, and a blade carried by the stem, of a crank secured to said stem, and a spring having a portion mounted on said handle at the rear end thereof and inserted into the handle in substantial axial alinement with said stem, another portion of said spring being secured to said crank, said spring being operative by the hand of the operator to cause rotation of said crank, and to return the same to normal position upon release of the spring.

2. In a cake turner, the combination with a handle having a hole at the rear end thereof, a stem rotatable relatively thereto and a crank secured to said stem, of a spring having a hook adapted to enter said hole, the adjacent portion of said spring being wedged against said handle to prevent side movement of the spring, the other end of said spring engaging with said crank and adapted to be depressed by the hand of the operator so as to rotate said crank, and to return the same to normal position upon release of said spring.

3. In a cake turner, the combination with a handle, of a stem rotatable relatively thereto, and a crank to rotate the same secured to said stem, said stem having a notch in the side thereof, said crank having an upraised lip adapted to be forced into engagement with said notch to rigidly hold the crank in nonrotatable position upon said stem.

4. In a cake turner, the combination of a handle, a stem rotatable relatively thereto and means including a spring cooperating with said handle and said stem to effect rotation of said stem, said handle having a hole at the rear end thereof to engage the means aforesaid, and a notch upon the outside of said handle co-operating with said means to prevent rotation of the same about the hole aforesaid.

5. In a cake turner, the combination with a handle having a bearing, a stem rotatable therein, a blade borne by said stem, and a crank secured to said stem to rotate the same in the bearing aforesaid, of an actuator having a pair of hooks at the ends thereof directed toward each other, whereof one is adapted to engage with the handle while the other engages the crank to hold the same in operative relation to the handle, said actuator serving thus in co-operation with said crank to retain said stem in engagement with said bearing.

6. In a cake turner, the combination with a handle having a bearing, a stem rotatable therein, a blade borne by said stem, and a crank secured to said stem to rotate the same in the bearing aforesaid, of an actuator having means to detachably secure it to the handle and having at one end a hook to engage the crank to hold the same in operative relation to the handle, said actuator serving thus in co-operation with said crank to retain said stem in engagement with said bearing and the actuator in the detachable engagement aforesaid.

In testimony whereof I affix my signature.

ROBERT A. MOORE.